July 22, 1969    J. J. SELWAY    3,456,928
COMBINED BLAST FURNACE SCRUBBER AND DUST CATCHER
Filed May 24, 1967    2 Sheets-Sheet 1
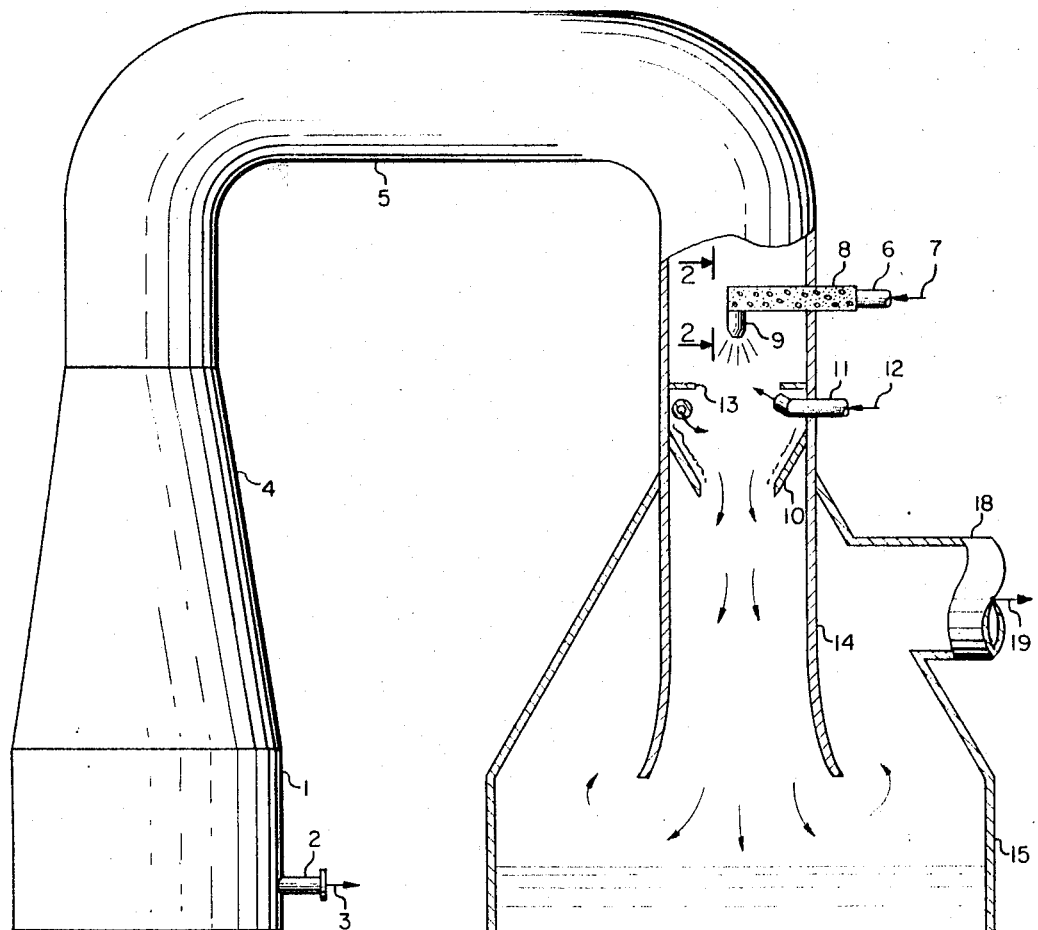
FIG. 1
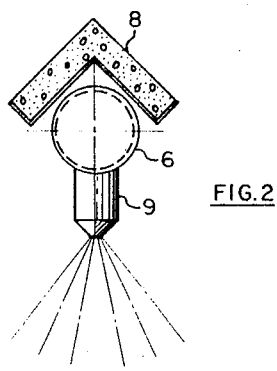
FIG. 2
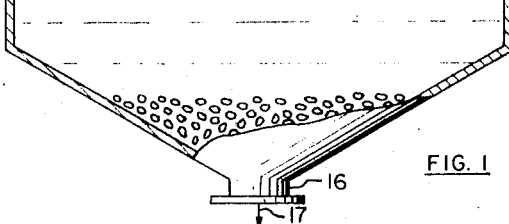
JACK J. SELWAY
INVENTOR.
BY J. T. Chaboty
AGENT July 22, 1969 J. J. SELWAY 3,456,928
COMBINED BLAST FURNACE SCRUBBER AND DUST CATCHER
Filed May 24, 1967 2 Sheets-Sheet 2

JACK J. SELWAY
INVENTOR.
BY J. T. Chaboty
AGENT

United States Patent Office 3,456,928
Patented July 22, 1969

3,456,928
COMBINED BLAST FURNACE SCRUBBER AND DUST CATCHER
Jack J. Selway, Deal, N.J., assignor to Chemical Construction Corporation, New York, N.Y., a corporation of Delaware
Filed May 24, 1967, Ser. No. 641,020
Int. Cl. C10k *1/08;* B01d *47/14, 47/06*
U.S. Cl. 261—22                                2 Claims

ABSTRACT OF THE DISCLOSURE

An apparatus is provided for quench-scrubbing hot off-gas discharged from a blast furnace, and for removing large entrained solid particles in a liquid slurry. The apparatus includes an initial section for contacting hot off-gas with water, which is provided with an annular venturi baffle and a central spray nozzle to spray water centrally into the hot gas above the baffle, as well as a plurality of ducts to discharge water onto the upper annular baffle as a descending spiral liquid film. The initial gas-liquid contact section terminates within a slurry retention container and above a body of deposited liquid slurry which is removed from the bottom of the container at a controlled rate, so as to maintain a liquid phase in the container. The quenched and scrubbed gas is removed from the container above the lower terminus of the gas-liquid contact section, and in a preferred embodiment the gas is further scrubbed in a horizontal conduit, followed by scrubbing in a vertical venturi passage and a final gas washing and entrainment separation container which is vertically oriented and provided with at least one bed of packing, which is sprayed with liquid water to provide final gas washing and cooling.

Background of the invention

Figure 3:
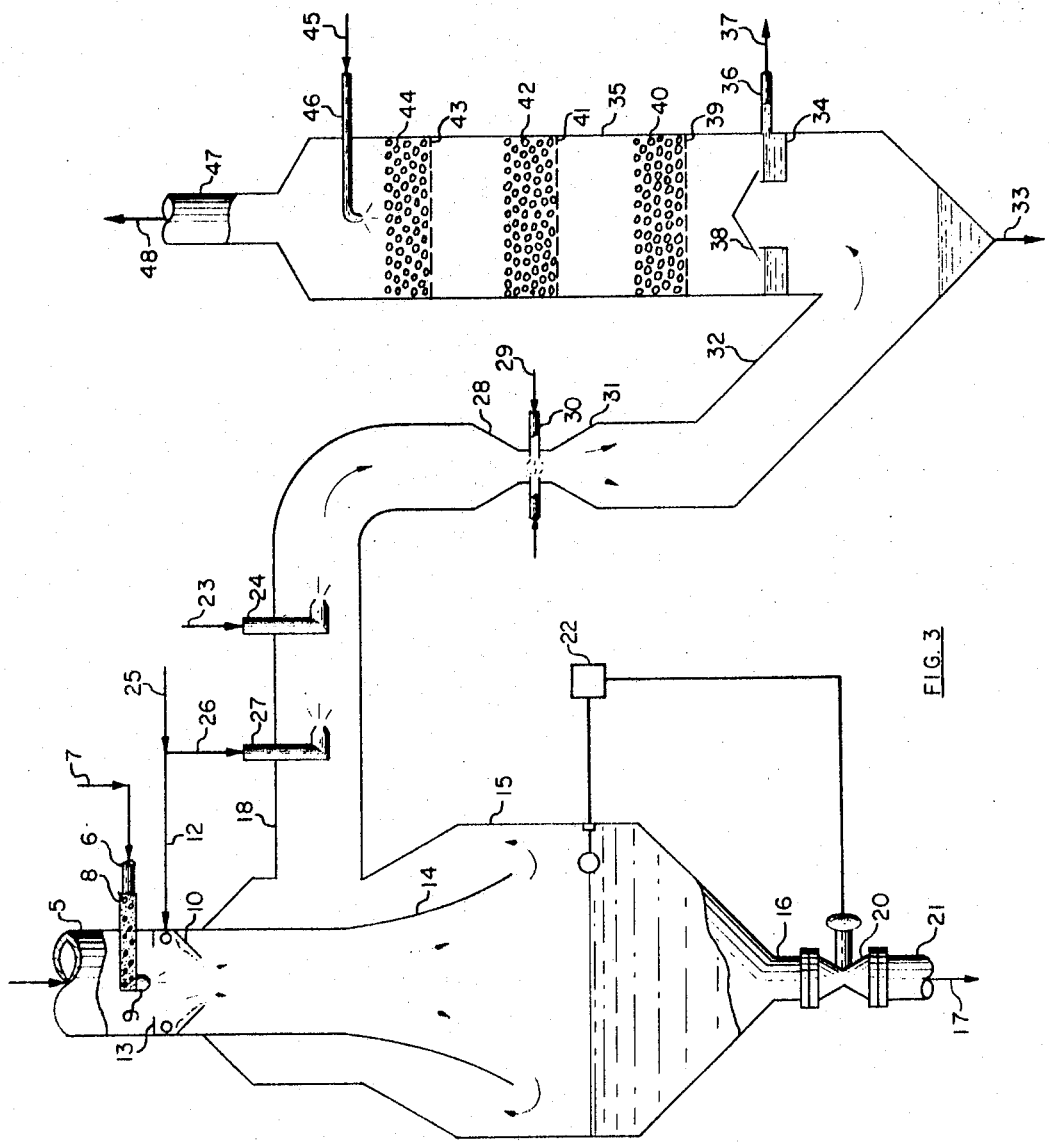

*Field of the invention.*—The present invention relates to the quenching and concomitant removal of solid particulate matter from the hot off-gas derived from steel blast furnaces or other furnace sources which generate an off-gas laden with solid particle of relatively large dimension, such as other types of metallurgical furnaces, pyrites smelters, etc. An improved apparatus is provided, in which the gas derived from the furnace is initially scrubbed with water to attain quenching and solids removal in an improved manner. The deposition of solids in the form of a layer or cake is effectively prevented. The gas is subsequently further scrubbed and cooled in a venturi scrubber and packed-bed gas washing tower.

*Description of the prior art.*—The conventional procedure in treating to off-gas from a steel blast furnace or the like is to pass the off-gas, which is initially laden with entrained solid particles of relatively large dimension as well as fine dust particles, through a dry dust catcher of suitable design which separates out the larger particles in a dry state by settling them to the bottom of the unit in accordance with Stokes' law, by a change of gas flow direction in the vessel. The accumulated solids are periodically discharged by opening a bottom valve, such as a gate valve. This prior art arrangement has led to problems in practice, because the solids tend to agglomerate and form a cake or layer which laminates the inner walls of the unit, which leads to eventual plugging of the unit and blockage of the discharge valve.

Numerous patents illustrate this conventional arrangement of a dry dust catcher followed by a wet washer. Among these may be mentioned U.S. Patent No. 3,041,059. Various prior art arrangements of apparatus for the wet scrubbing of blast furnace off-gas include U.S. Patents Nos. 3,140,163, 2,702,699, 3,199,267, 2,940,733, 3,196,002 and 3,067,991. Other patents relating to gas quenching include U.S. Patents Nos. 3,262,685 and 3,212,761.

Summary of the invention

In the present invention, an apparatus is provided which effectively quenches and scrubs the hot solids-laden off-gas as initially derived from a blast furnace or the like, so as to initially contact the hot off-gas with liquid water and thereby initially remove the larger solid particles in the form of a slurry. The apparatus includes a first conduit which extends directly from the hot gas source such as a steel blast furnace, and terminates with a gas-liquid contact section which extends vertically downwards to a terminal outlet within a slurry retention container. A horizontal pipe extends into the first conduit above the container and passes water to a terminal central spray nozzle which sprays water centrally downwards into the vertical gas-liquid contact section. An inverted frusto-conical baffle is disposed in the gas-liquid contact section below the horizontal pipe, and extends inwards and downwards from the wall of the conduit to a central opening. Water is passed onto the upper surface of the baffle in a circular stream by a plurality of tangential ducts. The water flows down the surface of the baffle in a spiral stream and is projected into the gas stream at the central opening of the baffle. A liquid slurry is removed from the bottom of the container, so that the liquid level in the container is maintained below the lower terminal outlet of the first conduit. A second conduit is also provided, which extends from an opening in the container above the lower outlet of the first conduit to suitable apparatus for disposal of quenched and scrubbed off-gas. In a preferred embodiment, the quenched and scrubbed off-gas is further scrubbed and cooled in a vertical venturi passage and a packed gas washing tower.

A principal advantage of the invention is that the entrained larger solid particles are removed from the gas stream and collected in the form of a liquid slurry, which is readily removed from the slurry retention container without causing plugging or blockage of the valves or piping in the solids removal system. Thus, the prior art problem of lamination of the dry dust catcher interior with layers or agglomerated masses of solids has now been eliminated. Another advantage is that the hot off-gas stream is effectively and uniformly quenched to a lower temperature and is also effectively scrubbed for removal of finer dust particles. A further advantage, in the preferred embodiment of the invention in which the gas discharged from the slurry retention container is further passed downwards through a vertical venturi passage and upwards through a packed gas washing tower, is that a final clean and cooled off-gas is produced which is substantially free of entrained solid particles and is also free of liquid droplets. The final gas stream, in instances when the off-gas is derived from a steel blast furnace, consists principally of carbon monoxide, and may be employed as a fuel or for chemical purposes such as the production of hydrogen. In other instances, the off-gas may be derived from a pyrites roaster, in which case the final clean off-gas contains a significant proportion of sulfur dioxide, and may be employed in the contact process for the production of sulfuric acid, after removal of water vapor.

It is an object of the present invention to provide an improved apparatus for the quench-scrubbing of hot off-gas derived from a steel blast furnace or the like.

Another object is to provide an apparatus for the removal of larger solids particles from a hot off-gas derived from a steel furnace or the like, in the form of a liquid slurry.

A further object is to prevent the deposition of entrained solids in the form of a lamination or layers, or as agglomerated masses, in the treatment of off-gas derived from a steel blast furnace or the like.

An additional object is to produce a cooled gas stream, substantially free of entrained solid particles and water droplets, from the hot solids-laden off-gas produced by a steel blast furnace or the like, by the provision of an improved combination of a quench-scrubbing apparatus arrangement combined with a venturi scrubber and a packed gas washing tower.

Still another object is to provide an improved apparatus for the combined quench-scrubbing and removal of large solid particles from a hot solids-laden off-gas derived from a steel blast furnace or the like.

These and other objects and advantages of the present invention will become evident from the description of the invention which follows.

Description of the drawings and preferred embodiments

Referring to the figures:

FIGURE 1 is a sectional elevation view of the quench-scrubbing and liquid slurry formation section of the apparatus, in which large entrained solid particles are removed from a hot steel blast furnace off-gas in the form of a liquid slurry, FIGURE 2 is an elevation view of a portion of FIGURE 1, taken on section 2—2, and FIGURE 3 is a sectional elevation view of a preferred embodiment of the invention, illustrating the combination of apparatus units of the invention for producing a clean and cooled off-gas stream, substantially free of entrained solid particles and water droplets.

Referring now to FIGURE 1, furnace 1 is a steel blast furnace which generates a hot solids-laden off-gas. Outlet tapping unit 2 serves to continuously or periodically remove molten steel stream 3. The generated off-gas is collected from furnace 1 by a movable hood 4, which may alternatively be a permanently mounted transition conduit. The hot off-gas thus passes to the conduit 5, which extends from the outlet of section 4 and terminates with a vertical gas-liquid contact section which extends vertically downwards. A horizontal pipe 6 extends into the vertical section of conduit 5, and liquid water stream 7 passes through the pipe 6 as a quench water stream. A refractory baffle 8 is preferably provided above the pipe 6 within conduit 5, to prevent abrasion or erosion of pipe 6 due to contact with the hot solids-laden gas stream. The baffle 8 will usually consist of concrete or other similar resistant material. A central spray nozzle 9 is provided at the inner end of pipe 6, which terminates at or adjacent to the central axis of the vertical gas-liquid contact section of conduit 5. The spray nozzle 9 serves to spray water stream 7 downwards and outwards at the central axis of the vertical section of conduit 5.

An inverted frusto-conical baffle 10 is disposed in the vertical section of conduit 5 below pipe 6, and extends inwards and downwards from the wall of conduit 5 to a central opening. A plurality of ducts 11 extend horizontally into conduit 5 above the upper terminus of baffle 10. The ducts 11 are spaced apart and disposed tangentially to the inner wall of conduit 5. Water stream 12 is passed inwards and into conduit 5 through ducts 11, and is discharged onto the upper surface of baffle 10 in a circular flow pattern. The discharged water stream 12 then flows downwards across the upper surface of baffle 10 in a spiral flow pattern and is projected into the downflowing hot off-gas at the central opening in baffle 10. A substantially horizontal ring-shaped baffle 13 is provided within conduit 5 above the ducts 11, so as to prevent solids deposition and buildup adjacent to the ducts. The baffle 13 extends inwards from the wall of conduit 5 to a central opening having a perimeter inside the inner edge of the ducts 11, so that the ducts 11 discharge water onto the upper surface of baffle 10 below baffle 13.

The mixed gas-liquid stream discharged downwards through the central opening in baffle 10 now flows downwards through the lower terminal outlet portion 14 of the conduit 5, which extends downwards from the gas-liquid contact section and into slurry retention container 15. Section 14 preferably flares outwards in a downwards direction within container 15. Accumulated slurry containing solid particles is collected in the lower portion of container 15, and is removed via lower outlet 16 as stream 17 at a controlled rate, so as to maintain a body of liquid slurry in the lower portion of container 15.

The gaseous phase in container 15, consisting of quenched and at least partially scrubbed off-gas, now contains a minor proportion of entrained water droplets and finer solid particles. The gas phase is removed from an outlet opening in container 15 above the lower terminus of section 14 via conduit 18 as stream 19. The conduit 18 will preferably extend horizontally, and as will appear infra, in some instances the gas stream 19 will be passed through additional apparatus, to accomplish additional scrubbing or washing and cooling. In other instances, stream 19 may be directly usable as a fuel gas or for other purposes, or may be discharged to the atmosphere.

Referring now to FIGURE 2, a sectional elevation view of a portion of FIGURE 1 is provided, taken on section 2—2. FIGURE 2 illustrates the arrangement of the refractory concrete baffle 8 above the pipe 6 and nozzle 9. The baffle 8 will preferably be disposed as an angular concrete casting having an upper central apex.

Referring to FIGURE 3, a preferred embodiment of the invention is presented, in which an apparatus combination is provided which attains total scrubbing and washing of the off-gas stream, with the production of a clean cooled final gas stream substantially free of solid particles and entrained water droplets. The initial portion of the apparatus arrangement of FIGURE 3 is similar to the apparatus described supra with respect to FIGURE 1. Thus, the hot solids-laden off-gas passes downwards through conduit 5. Pipe 6 extends horizontally into conduit 5, and water stream 7 passes inwards through pipe 6 and is centrally sprayed into the hot gas stream via downwardly oriented spray nozzle 9. Baffle 8 is provided above pipe 6 and nozzle 9. Inverted frusto-conical baffle 10 is disposed within conduit 5 below nozzle 9, and water stream 12 is passed onto the upper surface of baffle 10, and flows downwards and is projected into the gas stream at the lower central outlet of baffle 10. The mixed gas-liquid stream flows downwards through the outwardly flaring lower terminal portion 14 of conduit 5, and a liquid slurry phase collects in the lower portion of container 15. Lower outlet 16 extends to control valve 20, and excess liquid slurry is discharged through valve 20 via conduit 21 as stream 17. The setting or position of valve 20 is controlled by controller 22, which extends to a float or other suitable liquid level measuring means within container 15. Numerous control means for the control of the liquid level in container 15 by regulation of the setting of valve 20 may be provided in practice, such as various types of electronic or pneumatic controls, as for example the controller and controlled valve described in the U.S. Patent No. 2,540,361 or 2,520,302.

The cooled and partially scrubbed gas phase in container 15, which now contains entrained water droplets as well as residual fine solids particles, passes upwards in container 15 external to conduit section 14 and then passes into horizontal conduit 18. Units are provided at the central axis of conduit 18 to spray water horizontally into the gas stream, so as to provide a further scrubbing effect and also to wash deposited solids from conduit 18. Water stream 23 is passed into the vertically oriented duct 24, which extends downward into conduit 18 and terminates with a centrally disposed horizontal spray outlet. In addition, water stream 25 is divided into streams 12 and 26. Stream 12 is employed as described supra, while stream 26 is passed into the vertically oriented duct 27, which is an auxiliary spray means which extends downward into conduit 18 and terminates with a centrally disposed horizontal spray outlet. The action of the water sprays discharged from the horizontal spray nozzle outlets of ducts 24 and 27 serves to propel the gas stream through the horizontal duct 18, as well as providing a washing effect which removes deposited solids from duct 18. In addition, a gas scrubbing or washing effect is also produced by the action of the horizontal water sprays in conduit 18.

The conduit 18 terminates at a connection with the upper inlet of a vertically oriented venturi passage, so as to pass the gas stream downwards through the venturi passage. Thus, the gas stream passes downwards, through the converging passage 28, and water stream 29 is projected horizontally by duct or nozzle 30 into the highly accelerated gas stream at the throat section of the venturi passage. The resulting action of the high velocity gas stream on the liquid phase serves to disperse the liquid stream into a fine mist of discrete liquid droplets which impinge upon solid particles entrained in the gas stream. Thus, the resulting gas-liquid mixture discharged downwards through the diverging section 31 of the venturi passage consists of a gas phase substantially free of solids and a liquid phase containing entrained solid particles. The resulting mixed stream passes through inclined conduit 32, with collected liquid containing entrained solids being withdrawn from the bottom of conduit 32 as thin slurry stream 33, which is passed to a thickener or other disposal means.

The gas phase discharged from conduit 32 now contains entrained liquid droplets, and in some instances the gas phase will contain very minor proportions of residual solid particulate matter. The gas stream passes below the horizontal baffle 34 and into the lower portion of the gas washing container or tower 35, in which entrained liquid droplets are removed from the gas stream by scrubbing with liquid water in packing bed sections. The baffle 34 is provided with a central opening and a circular vertical retaining weir, which serves to retain downflowing relatively clean scrubbing water which is removed via pipe 36 as stream 37. A conical baffle 38 is disposed above the central opening in baffle 34, so that the gas stream flows upwards between the baffle 38 and the baffle 34, while the downflowing liquid phase is diverted onto baffle 34 and does not flow through the central opening in baffle 34. Thus, the thin slurry stream 33 is maintained as a slurry and does not mix with the clean water in container 34, which is separately removed as stream 37 as described supra.

The rising gas stream above baffle 34 passes successively upwards through packing retaining grid 39, packing bed 40, grid 41, bed 42, grid 43 and bed 44. Liquid water stream 45 is sprayed via pipe 46 above bed 44, and flows successively downwards through beds 44, 42 and 40, and thus serves to wash the rising gas phase in container 35 and effectively remove entrained liquid particles. A cooled and washed gas stream is now removed from unit 35 above bed 44 via outlet conduit 47 as stream 48, which is essentially free of entrained liquid droplets as well as solid particles. Stream 48 may now be passed to any desired usage, such as in chemical manufacture as described supra, or may be discharged to atmosphere without producing air pollution effects.

I claim:

1. An apparatus for quenching and scrubbing hot solids-laden off-gas derived from a blast furnace or the like to remove entrained solid particles, which comprises a first conduit, said first conduit extending from said blast furnace and terminating with a gas-liquid contact section which extends vertically downwards to a lower terminal outlet within a slurry retention container, with the lower terminal outlet of said first conduit flaring outwards within said container, a horizontal pipe, said pipe extending into said first conduit above said container and terminating at the central axis of said vertical gas-liquid contact section, a refractory baffle disposed above said horizontal pipe and within said first conduit, said refractory baffle comprising an angular concrete casting with an upper central apex, a spray nozzle disposed at the end of said horizontal pipe within said first conduit, said spray nozzle being axially oriented and depending vertically downwards from said pipe to a lower liquid outlet, means to pass water through said pipe whereby a water spray is centrally and downwardly injected into said hot off-gas within said vertical gas-liquid contact section, an inverted frusto-conical baffle, said baffle extending inwards and downwards from the wall of said first conduit below said pipe and terminating at a central opening, a plurality of ducts, said ducts extending horizontally into said first conduit above and adjacent to the upper end of said baffle, said ducts being tangential to the wall of said first conduit, means to pass water through said ducts, whereby said water flows downwards across the upper surface of said baffle in a spiral flow pattern and is projected into said hot off-gas at said central opening, means to remove aqueous slurry from the lower section of said container at a controlled rate, whereby aqueous slurry is maintained in said container and the liquid level in said container is maintained below the lower terminal outlet of the gas-liquid contact section of said first conduit, a second conduit, said second conduit extending horizontally from an opening in said container above the lower terminal outlet of the gas-liquid contact section of said first conduit, a plurality of horizontally disposed liquid spray nozzles in series, said spray nozzles being spaced apart along the central horizontal axis of said second conduit, means to pass water to said spray nozzles, whereby water is sprayed horizontally into said gas stream in the direction of gas flow, said second conduit extending to the upper inlet of a vertically oriented venturi passage, whereby said gas stream flows downwards through said venturi passage, means to project water horizontally into said gas stream at the throat section of said venturi passage, a vertically oriented gas washing container, means to pass the mixed gas-water stream discharged downwards from said venturi passage into the lower end of said gas washing container, means at the bottom of said gas washing container to remove liquid water containing entrained solids, a plurality of beds of packing disposed in vertical series within said gas washing container, means to spray water downwardly into the uppermost of said beds of packing countercurrent to the rising gas phase within said container, a horizontal baffle within said gas washing container below said beds of packing, said horizontal baffle being provided with a central opening and a circular vertical weir about said central opening, whereby downflowing liquid water from said packing beds is retained on said horizontal baffle, means to remove water from said gas washing container adjacent to and above said horizontal baffle, a conical baffle, said conical baffle being disposed within said gas washing container below said beds of packing and above the central opening in said horizontal baffle, whereby the off-gas phase derived from said venturi passage flows upwards between said conical baffle and said horizontal baffle and through said beds of packing, and means above said beds of packing to remove scrubbed off-gas from said gas washing container, said scrubbed off-gas being free of water droplets.

2. The apparatus of claim 1, in which a horizontal ring-shaped baffle is provided within said first conduit above said ducts, said ring-shaped baffle extending inwards from the wall of said first conduit and terminating with a central opening, whereby said ducts discharge water onto the upper surface of said inverted frusto-conical baffle below said ring-shaped baffle.

(References on following page)

References Cited

UNITED STATES PATENTS

| | | | |
|---|---|---|---|
| 2,006,295 | 6/1935 | Chewning | 261—98 |
| 2,604,185 | 7/1952 | Johnstone et al. | |
| 2,691,423 | 10/1954 | McIlvaine. | |
| 2,731,466 | 1/1956 | Heffner | 23—259.5 |
| 2,747,847 | 5/1956 | Otto | 261—116 X |
| 3,222,136 | 12/1965 | Hess et al. | |
| 3,262,685 | 7/1966 | Pike et al. | |
| 3,331,591 | 7/1967 | Dell'Agnese et al. | 261—115 X |
| 3,130,024 | 4/1964 | Vaughan | 261—119 X |

FOREIGN PATENTS 624,542   4/1927   France.

RONALD R. WEAVER, Primary Examiner

U.S. Cl. X.R.

23—277; 75—60; 261—115; 266—15, 17